United States Patent [19]

Hruska et al.

[11] Patent Number: 5,098,038
[45] Date of Patent: Mar. 24, 1992

[54] RETRACTABLE GUIDE APPARATUS

[75] Inventors: Bill Hruska; Gary Carpenter; Chris Stratford, all of Jamestown, N. Dak.

[73] Assignee: Lucas Western Inc., N. Dak.

[21] Appl. No.: 717,650

[22] Filed: Jun. 19, 1991

[51] Int. Cl.⁵ .................................. B64C 1/22
[52] U.S. Cl. ........................ 244/137.1; 244/118.1; 193/35 SS
[58] Field of Search .............. 244/118.1, 137.1; 414/531, 535, 534; 410/66, 67; 193/35 SS, 35 C, 35 R, 35 B

[56] References Cited

U.S. PATENT DOCUMENTS

| 2,468,925 | 5/1949 | DeBoer | 296/16 |
| 2,973,073 | 2/1961 | Elliott | 193/38 |
| 3,209,880 | 7/1964 | Dietiker | 193/37 |
| 3,225,945 | 12/1965 | Yoder | 414/535 X |
| 3,402,802 | 9/1968 | Lint | 193/37 |
| 3,741,504 | 6/1973 | Alberti et al. | 244/137 R |
| 3,986,460 | 10/1976 | Voigt et al. | 105/366 C |
| 4,000,870 | 1/1977 | Davies | 244/118 R |
| 4,077,590 | 3/1978 | Shorey | 244/118 R |
| 4,081,157 | 3/1978 | Petry | 193/35 B X |
| 4,134,345 | 1/1979 | Baldwin et al. | 105/366 B |
| 4,331,412 | 5/1982 | Graf | 244/118.1 X |
| 4,388,030 | 6/1983 | Skaale | 410/69 |
| 4,462,493 | 7/1984 | Nordstrom | 193/35 R |
| 4,484,846 | 11/1984 | Engel et al. | 244/137.1 X |
| 4,498,823 | 2/1985 | Trautman | 410/84 |
| 4,583,896 | 4/1986 | Vogg et al. | 410/69 |
| 4,807,735 | 2/1989 | Huber | 193/35 B |
| 4,823,927 | 4/1989 | Jensen | 193/35 SS |
| 4,875,645 | 10/1989 | Courter | 244/137.1 |
| 4,909,372 | 3/1990 | Jones | 193/35 SS |
| 4,993,899 | 2/1991 | Engel et al. | 244/137.1 X |

Primary Examiner—Joseph F. Peters, Jr.
Assistant Examiner—Carla Mattix
Attorney, Agent, or Firm—Carothers & Carothers

[57] ABSTRACT

A guide apparatus adapted to contact cargo loads in load bearing engagement for guiding such cargo loads in movement thereof within a cargo hold or bay, the guide apparatus being pivotally moveable selectively between a stowed position and a deployed position by an actuating structure which is isolated from the cargo loads borne by the guide apparatus when in the deployed position.

11 Claims, 1 Drawing Sheet

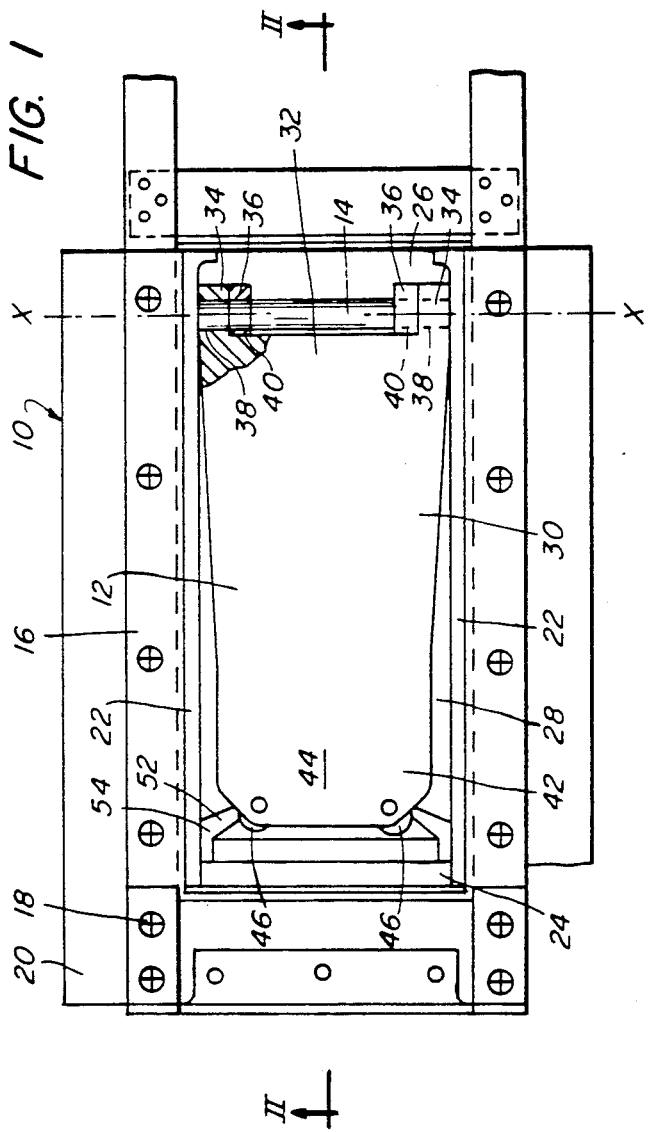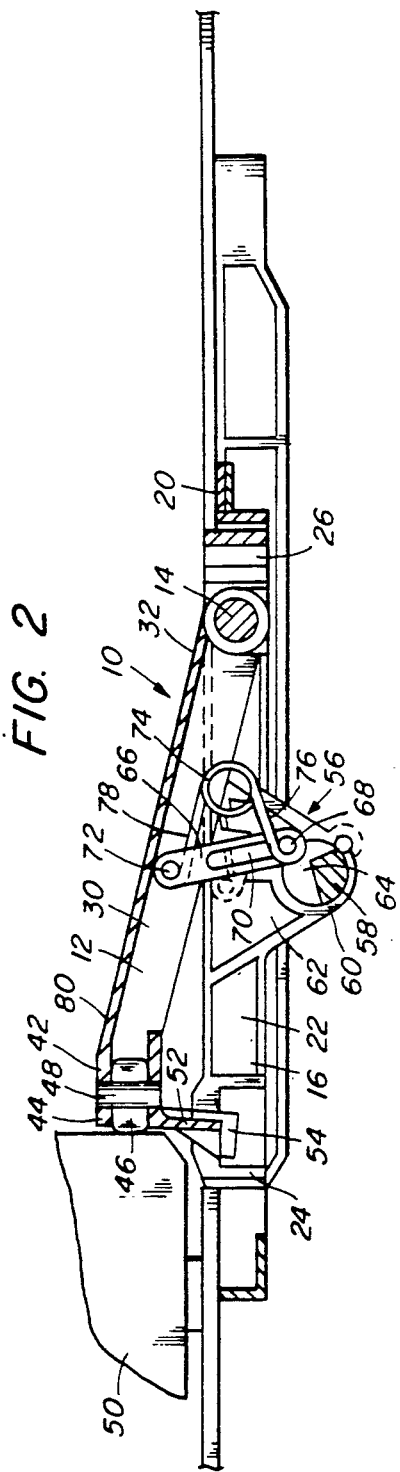

RETRACTABLE GUIDE APPARATUS

BACKGROUND OF THE INVENTION

In the art of cargo load handling and manipulation such as typified by various known conveyors, chutes, skids, guides and ways, it is well known to provide guides to enhance the ease and efficiency of moving cargo loads. For example, in air freight operations it is well known to provide a variety of skids, rollers, guides, hold-downs and the like in the cargo hold of an aircraft to permit greater ease and efficiency in the handling of large cargo loads such as unitized cargo load containers.

The art is replete with examples of such apparatus and includes, without limitation, U.S. Pat. Nos. 4,462,493, 4,807,735, 4,909,372, 4,823,927, 2,973,073, 3,209,880, 2,468,925, 3,402,802, 4,000,870, 3,986,460, 4,077,590, 4,583,896, 4,498,823, 4,134,345, 4,875,645, 3,741,504 and 4,388,030. Among the above listed patents, number 2,468,925 discloses a floor roller mounted on a spring biased, pivotally moveable carrier by which the roller may be moved between a stowed position in the floor and a deployed position projecting above the floor. Also, U.S. Pat. No. 4,583,896 discloses an aircraft cargo restraint which is moveable between deployed and stowed positions using a spring biased over-center actuating structure including elements which provide a pin connection having an idle stroke.

BRIEF SUMMMARY OF THE INVENTION

The present invention contemplates an improved guide apparatus including a guide head which is pivotally moveable with respect to a guide frame between stowed and deployed positions. In the deployed position the guide head is located to laterally engage cargo loads in load bearing engagement to thereby guide the same for enhanced ease and efficiency in moving such cargo loads in a cargo hold or bay, particularly the cargo hold of an aircraft. Accordingly, the guide apparatus frame preferably is adapted to be mounted to the air frame structure at a position generally flush with the aircraft cargo hold floor such that the guide head projects above the cargo hold floor only when in the deployed position, and when stowed it is essentially flush with or beneath the cargo hold floor.

An actuating structure is operable to move the guide head pivotally with respect to the guide frame between the stowed and deployed positions, the actuating apparatus including in one preferred embodiment a link means pivotally connected to the guide head and also pivotally connected eccentrically to a rotary shaft for moving the guide head between the stowed and deployed positions upon rotation of the rotary shaft. The actuating link includes a lost motion capability in at least one of its pivot connections to the guide head or the actuating shaft, and a biasing spring cooperates with the link structure to continuously urge the corresponding pivot connection toward one extreme position in the available range of lost motion.

The invention further contemplates a stop means which is cooperable with the guide head and the guide frame to limit the range of pivotal movement of the guide head with respect to the guide frame toward the deployed position.

The invention provides simplified design, highly reliable operation, and imposes minimum weight requirements while affording completely sufficient structural strength. This latter advantage is achieved in one aspect by having the actuating structure isolated from the cargo loads borne by the guide head when in the deployed position. Accordingly, the weight, strength and mass of the actuating structure can be limited since it need be designed only to meet the structural requirements for moving the guide head between its deployed and stowed positions. The magnitude of loads which will be borne by the guide head when in the deployed position need not be considered as design parameters of the actuating structure.

It is therefore one object of the invention to provide a novel and improved guide apparatus for guiding cargo loads such as in a cargo hold or bay.

A more specific object of the invention is to provide an improved retractable guide apparatus which is moveable between stowed and deployed positions by an actuating structure.

Another specific object of the invention is to provide a guide apparatus having a guide head which is mounted for pivotal movement with respect to a guide frame between a deployed and a stowed position, and an actuating structure which is operable to move the guide head between its deployed and stowed positions but which is isolated from cargo loads borne by the guide head when in the deployed position.

These and other objects and further advantages of the invention will be more readily understood upon consideration of the following detailed description and the accompanying drawings, in which:

FIG. 1 is a top plan view of a guide apparatus according to the present invention; and FIG. 2 is a sectioned side elevation taken on line II—II of FIG. 1.

There is generally indicated at 10 in FIGS. 1 and 2 a guide apparatus constructed according to one presently preferred embodiment of the invention and comprised of a guide head 12 pivotally mounted by a pivot pin 14 to a guide frame 16 that is rigidly retained as by fasteners 18 with respect to the floor 20 of a cargo containment or compartment such as the cargo hold of an aircraft. More specifically, guide frame 16 includes a pair of mutually coextensive, laterally spaced side portions 22 and longitudinally spaced end portions 24, 26 which join the side portions 22 adjacent their respective opposed ends. The side and end portions 22, 24 and 26 thus form a generally polygonal, for example, rectangular, frame enclosing a space 28.

Guide head 12 comprises an elongated, rigid and preferably unitary body member 30 which is disposed within space 28 and extends longitudinally thereof. One longitudinal end 32 of body member 30 includes laterally spaced lug portions 34 which are received adjacent cooperable lug portions 36 of frame end portion 26. The respective pairs of adjacent lugs 34 and 36 include coaxially aligned through openings 38 and 40, respectively, within which is received the pivot pin 14 whereby guide head 12 is retained for pivotal movement with respect to frame 16 about axis X—X of pivot pin 14.

The opposed end 42 of guide head body 30 includes a slightly angled or offset guide portion 44 which carries any suitable guide elements such as a plurality of rollers 46 disposed for rotation on respective vertical axis 48 to contact cargo loads 50 in load bearing engagement for the purpose of guiding such cargo loads 50.

The laterally directed loads borne by guide head 12 in laterally engaging and supporting cargo loads 50 are transmitted through the guide head 12 to guide frame 16 via pivot pin 14 and a stop portion 52 of guide body member head portion 44. Stop 52 preferably may be integral with guide body member head portion 44, depending downwardly therefrom to a foot or base portion 54 which is engageable with cooperating adjacent portions of frame end portion 24 when guide head 12 is in its deployed position as shown in FIG. 2.

For moving guide head 12 pivotally between its stowed and deployed positions with respect to frame 16, an actuating structure generally indicated at 56 (FIG. 2) is provided. Actuating structure 56 includes a rotary actuating shaft 58 which is rotatably supported with respect to frame 16, for example by being supported within coaxially aligned through boards 60 which extend within a respective pair of laterally spaced depending lug portions 62 that are formed integrally with the respective side portions 22 of guide frame 16.

Shaft 58 includes preferably a pair of axially spaced notched-out portions 64 which accommodate the travel of an elongated link 66 which is pivotally connected eccentrically with respect to shaft 58 by a pivot connection 68. Link 66 is free to travel longitudinally with respect to pivot connection 68 within the confines of an elongated slot 70 extending longitudinally of link 66 from one end thereof. The opposed longitudinal end of link 66 is pivotally affixed as by a pivot connection 72 to guide head body member 30 at a point generally longitudinally intermediate end portions 32 and 42 thereof.

Although pivot connection 68 is free to move longitudinally of link 66 within the confines of slot 70, it is nevertheless continuously urged toward the position within slot 70 furthest displaced from pivot connection 72 by a biasing spring 74, for example a coil spring having free end portions 76 and 78 which are captured between the respective pivot connections 68 and 72. The bias of spring 74 continuously urges spring end portions 76 and 78 apart to thereby continuously bias pivot connections 68 and 72 apart.

As may be appreciated from the above description, selective rotation of shaft 58, provided by any suitable motive means, may be employed to raise and lower pivot connection 68 with respect to frame 16. The pivotal connection of link 66 to shaft 58 and to guide head 12 thus transmits the up-and-down motion of pivot connection 68 to guide head 12 resulting in a corresponding up-and-down motion of guide head 12 between its stowed and deployed positions. The guide head 12 is, as noted, shown in its deployed position in FIG. 2. In the stowed position, the guide head 12 is lowered from the position shown in FIG. 2 to a position where the upper surface 80 of guide head body member 30 preferably is essentially flush with the plane of floor 20.

The available free motion of pivot connection 68 within slot 70 of link 66 permits pivotal movement of guide head 12 downwardly from the illustrated deployed position by incrementally overcoming the upward bias of spring 74. Accordingly, guide head 12 is not rigidly fixed in its deployed position and any loads applied thereto in the process of using the guide head to guide and control movements of heavy cargo loads thus cannot load the actuating structure.

In other words, actuating structure 56 is isolated from the cargo loads borne by guide head 12. All loads applied to guide head 12 may be resolved into orthogonal components, from which analysis it will be appreciated that load components directed laterally of guide head 12 in any direction will be supported primarily by pivot pin 14 and cooperating portions of frame end portion 26, and preferably also by stop 52. Sufficient free play is provided in actuating structure 56 that no such lateral loads are carried by the actuating structure 56. Vertically downward load components may result in incremental downward movement of guide head 12 as the bias of spring 74 is incrementally overcome; however, the free or lost motion capability afforded by the available movement of pivot connection 68 within slot 70 ensures that no such vertically downward directed loadings will load the actuating structure 56.

Finally, any vertically upwardly directed load components will be supported primarily by stop 52 and cooperating parts of frame end portion 24 engaged by the stop base portion 54 thereby limiting upward movement of guide head 12. In order to ensure that such vertically upward loadings also will not load actuating structure 56, the rotation of shaft 58 on deployment of guide head 12 preferably proceeds just slightly beyond the position required to permit the guide head 12 to reach its limit of upward pivotal movement. Accordingly, when actuating structure 56 is in the deployed configuration as shown in FIG. 2, pivot connection 68 is displaced slightly toward the pivot connection 72 from the furthest end of slot 70, and spring 74 is correspondingly compressed. This incremental degree of free play ensures that vertically upward load components will be supported through the main load bearing components of the guide head structure, namely pivot pin 14 and stop 52, rather than by actuating structure 56. The weight and mass of the guide head actuating structure 56 thus may be minimized as it need not bear any of the cargo loads supported by the apparatus in operation.

According to the description hereinabove there is provided by the instant invention a novel and improved retractable guide apparatus having an actuating structure with a free or lost motion capability which isolates the actuating apparatus from cargo loads imposed on the guide apparatus in operation. The cargo loads instead are imposed upon a guide head portion of the apparatus and transmitted to a guide frame portion through a pivot pin on which the guide head is pivotally moveable with respect to the guide frame between stowed and deployed positions thereof, and through a stop portion which if desired may be operative only when the guide head is in the deployed position.

Of course, we have envisioned and anticipated various alternative and modified embodiments which certainly would also occur to others versed in the art once apprised of our invention. Accordingly, it is intended that the invention should be construed broadly and limited only by the scope of the claims appended hereto.

We claim:

1. A retractable guide apparatus adapted to engage cargo loads in a cargo bay of an aircraft comprising:
   a rigid guide frame adapted to be rigidly mounted with respect to air frame elements of such an aircraft within such a cargo bay;
   a generally elongated rigid guide head movably carried by said guide frame for relative movement with respect to said guide frame between stowed and deployed positions;
   said guide head including contact means for engaging such a cargo load in load bearing engagement;
   support means movably supporting said guide head for said relative movement with respect to said guide frame between such deployed and stowed positions and for transmission of loads borne by said guide head to said guide frame when said guide head is in such a deployed position with said contact means in such load bearing engagement with such a cargo load;

said support means including a pivot axis means pivotally supporting said guide head for pivotal movement with respect to said guide frame between such stowed and deployed positions;

said support means further including stop means which is operable to support said guide head with respect to said guide frame at least when said guide head is disposed in such a deployed position;

actuator means cooperable with said guide head and said guide frame to pivotally move said guide head about said pivot axis means with respect to said guide frame between such stowed and deployed positions; and said actuator means including lost motion connection means which is operable to isolate said actuator means from such loads borne by said guide head when said contact means is in load bearing engagement with such cargo loads in a manner that such loads borne by said guide head are transmitted to said guide frame substantially entirely through said support means.

2. The guide apparatus as set forth in claim 1 wherein said stop means is operable to provide load bearing engagement between said guide head and said guide frame substantially only when said guide head is disposed in such a deployed position.

3. The guide apparatus as set forth in claim 1 wherein said lost motion connection means includes elongated link means operatively engaging said guide head for positively moving said guide head in only one direction of pivotal movement between such a stowed position and such a deployed position.

4. The guide apparatus as set forth in claim 3 wherein said lost motion connection means further includes first connection means pivotally connecting said link means with respect to other portions of said actuator means, said first connection means being freely moveable within predetermined limits longitudinally of said link means.

5. The guide apparatus as set forth in claim 4 wherein said link means additionally includes second connection means spaced longitudinally of said link means from said first connection means, said second connection means pivotally connecting said link means to said guide head.

6. The guide apparatus as set forth in claim 5 wherein said first connection means is movable within said predetermined limits toward and away from said second connection means, and said actuator means additionally includes biasing means maintained in biased relationship with said first and second connection means for biasing said first and second connection means toward the position of maximum separation therebetween permitted by said lost motion means.

7. The guide apparatus as set forth in claim 6 wherein said actuator means additionally includes rotary actuating shaft means pivotally connected to said link means by said first connection means, said shaft means being selectively rotatable to actuate said link means for moving said guide head to such stowed and deployed positions.

8. The guide apparatus as set forth in claim 1 wherein said stop means includes a depending stop element carried by said guide head and disposed for cooperable engagement with said guide frame at least when said guide head is in such deployed position.

9. The guide apparatus as set forth in claim 1 wherein said pivot axis means and said stop means are spaced apart longitudinaly of said guide head.

10. The guide apparatus as set forth in claim 9 wherein said actuator means is disposed with respect to said guide head longitudinally intermediate said pivot axis means and said stop means.

11. A load guide apparatus comprising:

a rigid frame;

a rigid guide head adapted to engage cargo loads in load bearing engagement;

pivot axis means pivotally connecting said guide head with respect to said frame for pivotal movement of said guide head with respect to said frame between a deployed position and a stowed position;

lost motion actuator means cooperably connected in lost motion relation between said guide head and said frame for moving said head to such stowed and deployed positions;

said actuator means including a shaft and a link means;

said link means having spaced pivotal connections, respectively, to said shaft at an eccentric position thereon and to said guide head;

at least one of said pivotal connections being moveable with respect to said link means within predetermined limits generally toward and away from the other of said pivotal connections to provide said lost motion relation by variation of the spacing between said spaced pivot connections;

biasing means cooperable with said spaced pivotal connections to bias said spaced pivotal connections toward the maximum attainable spacing therebetween;

stop means for limiting pivotal movement of said guide head toward such a deployed position, said stop means being engageable with said guide head and said frame to provide a load bearing connection therebetween when said guide head is in such a deployed position; and said actuator means being operable by selective rotation of said shaft to move said guide head to such a deployed position and to position said one of said pivotal connections upon engagement of said stop means with said frame and said guide head at a location intermediate said predetermined limits such that said lost motion actuator means is isolated from loads borne by said guide head when said guide head is disposed in such a deployed position.

* * * * *